(12) United States Patent
Cubbage (10) Patent No.: US 12,503,223 B1
(45) Date of Patent: Dec. 23, 2025

(54) REACTION DRIVE HELICOPTER WITH CYCLOROTOR PROPULSION AND CONTROL

(71) Applicant: Scott Alan Cubbage, Laguna Niguel, CA (US)

(72) Inventor: Scott Alan Cubbage, Laguna Niguel, CA (US)

( * ) Notice: Subject to any disclaimer, the term of this patent is extended or adjusted under 35 U.S.C. 154(b) by 0 days.

(21) Appl. No.: 19/225,237

(22) Filed: Jun. 2, 2025

(51) Int. Cl.
    *B64C 27/16* (2006.01)

(52) U.S. Cl.
    CPC .................................. *B64C 27/16* (2013.01)

(58) Field of Classification Search
    CPC ...................................................... B64C 27/16
    See application file for complete search history.

(56) References Cited

U.S. PATENT DOCUMENTS

| | | | | |
|---|---|---|---|---|
| 2007/0200029 | A1* | 8/2007 | Sullivan | B64U 50/14 244/10 |
| 2012/0256042 | A1* | 10/2012 | Altmikus | B64C 39/008 244/17.21 |
| 2016/0376003 | A1* | 12/2016 | Feldman | B64D 43/00 703/2 |

FOREIGN PATENT DOCUMENTS

| | | | | | |
|---|---|---|---|---|---|
| CN | 109383792 | A | * | 2/2019 | ............ B64C 27/82 |
| CN | 209274896 | U | * | 8/2019 | |
| CN | 114313259 | A | * | 4/2022 | |
| EP | 4091939 | A1 | * | 11/2022 | ......... B64C 29/0025 |

* cited by examiner

*Primary Examiner* — Justin M Benedik (57) ABSTRACT

Disclosed is a reaction-drive type rotorcraft. Thrust generators in the form of cycloidal rotor systems mounted on a main rotor system cause the rotors to spin and generate lift, and additionally, may be controlled to produce variable amounts and directions of thrust for control of position and velocity of the vehicle. The use of cycloidal rotor system thrust generators with vertical axes parallel to the spin axis of the main rotor system eliminates the occurrence of mechanical wear and component fatigue associated with steady-state gyroscopic precession forces. The rotorcraft may exist as a single rotating unit, or a main rotor system may spin while connected to a generally non-rotating fuselage used for carriage of personnel or payload. Vehicle sizes may range from small, uncrewed air vehicle systems to large, crewed aircraft and remotely operated aerial cranes.

6 Claims, 9 Drawing Sheets

REACTION DRIVE HELICOPTER WITH CYCLOROTOR PROPULSION AND CONTROL

CROSS-REFERENCE TO RELATED APPLICATIONS (Not Applicable)

STATEMENT REGARDING FEDERALLY SPONSORED RESEARCH AND DEVELOPMENT (Not Applicable)

BACKGROUND OF INVENTION

The present disclosure relates to the field of uncrewed or crewed rotary-wing aircraft, or rotorcraft. More specifically, the present disclosure relates to rotorcraft having thrust generators mounted on the rotors or on struts to cause the rotation of their rotors. These vehicles are often referred to as "reaction drive helicopters". And with further specificity, the present disclosure relates to reaction drive helicopters whose thrust generators are in the form of a cyclorotor. The choice of the cyclorotor eliminates a seldom anticipated but often encountered problem with reaction drive rotorcraft: component fatigue due to gyroscopic precession torque.

Rotorcraft such as crewed helicopters and uncrewed drones provide highly desired performance advantages such as the ability to take off and land vertically, and to hover during flight. However, such rotorcraft are plagued by inefficiencies, most notably mechanical complexity and frictional losses in the drivetrain, coupled with aerodynamic drag losses as the tips of the rotor blades often approach supersonic speeds. These inefficiencies combine to severely limit the flight endurance time because the onboard energy stored as fossil fuel or battery-stored electrical power is quickly expended. Previous systems have also been plagued by slow and non-intuitive responses to control inputs due to the high rotational inertia of the rotor system, the necessity of changing the general plane of rotation of the rotor system for vehicle control, and gyroscopic precession inherent in the spinning mass of the rotor system.

Many of the aforementioned problems are solved with a reaction drive helicopter system. A reaction drive helicopter system drives its rotors using thrust from thrust generators connected directly to the rotors as opposed to spinning them with torque produced, for example, within a non-rotating fuselage. If torque is not transmitted from a fuselage to the rotors, then the need to counteract the generated main rotor torque is eliminated.

Reaction drive thrust generators may be in the form of jets located at the tips of the rotors which expel gases at high speed, or they may take the form of motors driving some form of propeller. But reaction drive helicopter systems often have other challenges associated with their thrust generators.

The Hughes XH-17 Flying Crane, which had the largest rotor system ever built, was a tip-jet reaction drive helicopter. It was designed to carry a 4500 Kg payload at 105 Km/hr. Its jet thrust, afterburning rotor tips turned its 40 meter diameter rotor at less than 1½ revolutions per second as it flew. It was said that this helicopter was so loud it could be heard from 8 miles away when in flight. Ultimately, structural complications and poor fuel efficiency caused the program to be discontinued in late 1955.

The American Helicopter XH-26 and the Hiller YH-32 were single-place ultralight helicopters that used pulsejets or ramjets on their rotor tips to spin their rotor systems. These too suffered from poor fuel efficiency and excessive levels of noise when operating, as well as having poor autorotation capability due to the drag of the rotor tip jets.

Numerous preliminary attempts have been made at producing reaction drive helicopters by leveraging the use of electric motors turning ducted fans or propellers. The downfall of these designs has often been the non-obvious presence of gyroscopic precession forces on the spinning mass of the motors and their fans or propellers. When a spinning mass has its axis of spin changed, it is said to "precess" in the direction of the spin axis change. Even less obvious is the fact that the precession forces or torques cause fan blades and propeller blades to be flexed forward at one part of their rotation about the motor or turbine shaft and backward at a point opposite.

Most engineering materials used in structures are rated for working amounts of forces or stress, and ultimate stress before failure. Design of structures that have varying forces imposed on them must also consider that the allowable working and ultimate stress limits must be de-rated to lower values, and ultimately, a component may have to be removed from service after a certain number of "cycles" that load and unload the component. This is especially true in rotorcraft that often impose these cyclic loads on their components with every revolution of their propeller or rotor systems. In extreme cases, the fatigue life of components of the fan or propeller is reached in only a handful of operational hours.

While some inventions attempt to solve the gyroscopic precession torque problem by mounting counter-rotating motor/propeller systems back-to-back (Cabarbaye FR 3048956A1), each motor drive shaft and each propeller or fan blade still experiences forces that flex and fatigue the element at a rate of twice the rotational speed of the element. Placed back-to-back, the forces null each other out within the (hopefully very strong) mounting structure for the motor/propeller systems, but individual components of the motor/propeller systems are still subjected to the stresses of gyroscopic precession.

A gyroscopic precession torque is created when a spinning mass experiences a change in direction of its axis of rotation. The magnitude of the torque created is greatest when the forced precession is at right angles to the axis of spin. Calculation of gyroscopic precession torque is expressed by a vector cross product result. Gyroscopic precession torque increases proportionally with the rate that the spinning mass is turning about its spin axis and increases in proportion to the angular rate that the spin axis is forced to change. But if a spinning mass is merely translated without changing the direction of its spin axis-experiencing no precession in any direction at any rate-then no gyroscopic precession torque is generated.

The present invention provides a novel method to propel and precisely control a reaction drive helicopter by employing cycloidal rotor or "cyclorotor" propulsion systems mounted on the rotor blades or on support struts of the rotor system. The spin axes of the cyclorotor propulsion systems are oriented generally vertically, and parallel to the spin axis of the helicopter main rotor blade system itself, so steady-state operation of the helicopter produces no precession of the spin axes of the thrust generators. This means there are no gyroscopic precession torques imposed on the cyclorotor propulsion system, the propulsion system components, or on the vehicle chassis supporting the cyclorotor propulsion system.

Contrast this with previous systems where thrust generators' spin axes are either tangent to the main rotor system rotation (propellers, fans, or turbines) or radially arrayed crossflow fans. In either of these cases the rapidly spinning thrust generator is detrimentally caused to precess at the rotation rate at which the main rotor system is turning.

Cyclorotor systems, sometimes known as "cycloidal rotor systems" or "cyclo-gyros" stand apart from other propulsion systems by their means of thrust production. Cyclorotor systems typically employ airfoil shaped blades, but these blades are rotated with their span-wise axis parallel to the axis of rotation so the entire span of the blade experiences essentially the same speed of airflow. Contrast this with a conventional motor-propeller system, a helicopter rotor system, or an axial flow gas turbine engine in which the individual blades see nearly zero airspeed at the root of the blades, but experience speeds often approaching or exceeding supersonic at the tips of the blades. Aerodynamic elements often experience extreme amounts of drag force when operating in this trans-sonic regime.

Most widely-used propulsion systems such as motor-propellor systems, ducted fan systems, and gas turbine engines, produce thrust aligned with their primary axis of rotation. Cyclorotor propulsion systems, owing to their blade motion, produce thrust that is perpendicular to their primary axis of rotation. In their general form, cyclorotor systems can produce thrust radially in any direction in a plane perpendicular to their axis of rotation.

In summary, most reaction drive rotorcraft suffer one of two complications. One set of complications arises from the requirement to route fast, high-pressure, and sometimes high-temperature gases up through the mast and out through the rotor blades where the gas is expelled at the tips to provide the thrust needed to maintain rotor blade speed. This necessitates features (e.g. Nyhus U.S. Pat. No. 6,131,849A; van der Westhuizen U.S. Pat. No. 9,630,709 B1) which are needed to accommodate rotation, flexing, expansion, cooling of the ducting and components within the mast and/or rotors that convey hot gases to the rotor tips.

The other set of complications arises if, instead of expelling gas from the tips of the rotor blades, the vehicle employs motor-propeller units, ducted fans, or gas turbine engines mounted directly on spinning struts (e.g. Dong U.S. Pat. No. 10,723,449 B2) or directly on the rotors to propel them. In this case, gyroscopic precession torque causes excessive forces on parts of the rotor propulsion systems. This can range from propeller blades and ducted fan blades flexing and fatiguing twice per revolution due to the precession torque, to turbine supports and bearings that become overloaded and eventually fail while trying to continually resist gyroscopic precession induced forces on the spools of the turbine. These loads at the bearings can be significantly higher than the rated, non-gyroscopic loads they were designed for. One embodiment of one invention disclosed in the prior art (Peoples U.S. Pat. No. 11,753,155) employs both small gas turbine engines rotating with the main rotor blades, and the routing of their hot exhaust gases to tip jets on the main rotor blades.

BRIEF SUMMARY OF INVENTION

The present disclosure presents aspects that extend the service life of powered reaction drive helicopters while still providing for precise maneuvering and station-keeping which tend to be significant requirements within mission profiles for this type of long-endurance rotorcraft.

According to one aspect of the invention, this disclosure describes an air vehicle system capable of precise control of position and long time-duration of flight. The system comprises a powered rotorcraft with spinning wings or "main rotors" to generate lift. The air vehicle has control capability to command thrust from onboard thrust generators to maintain rotor blade system rotational speed, to variably control the amount and direction of lift produced by the spinning wings or rotors, and to variably control the magnitude and direction of thrust from onboard thrust generators as a function of their position with respect to a desired direction so that the rotorcraft moves and behaves in a useful and controlled manner.

Novel and unique to this invention is the use of vertical axis cyclorotor propulsion systems as thrust generators to drive the main rotors which generate no detrimental gyroscopic precession torques which can severely shorten the fatigue life of components.

Cyclorotor propulsion systems produce thrust that lies in a plane substantially perpendicular to the axis of rotation. The blades of the cyclorotor propulsion system move in a generally circular path with their spanwise direction parallel to the axis of rotation so that all parts of each blade see substantially the same speed of incident airflow.

In embodiments, the cyclorotor propulsion systems may be mounted above the plane of the main rotor rotation, within the plane of the main rotor rotation, below the plane of the main rotor rotation, or any advantageous combination of these mounting locations.

In embodiments, the main rotors may be of constant cross-section in the spanwise direction, or they may have variable chord length and variable airfoil profiles as vehicle mission profiles or performance requirements may dictate.

In embodiments, each main rotor has facility for mounting and control of one or more direct lift force control surfaces, which may act collectively to control the sum of the amount of lift force on the aircraft created by the rotors.

In embodiments, each main rotor has facility for mounting and control of one or more direct lift force control surfaces, which may act cyclically to control the net tilting moment created by varying lift forces on the aircraft created as the rotors rotate around the spin axis of the main rotors.

In embodiments, each rotor blade comprises, among other elements, a cyclorotor as its thrust generator. A cyclorotor is a mechanism with several blades arrayed with their spanwise axis parallel to the axis of rotation of the cyclorotor system. The cyclorotor blades are articulated in pitch and typically complete one cycle of pitch excursions with each rotation of the cyclorotor system. By controlling the point of the maximum (and opposing point minimum) pitch excursion, a net force is generated in the general direction of maximum commanded pitch. Instead of the spinning disk or shallow cone normally associated with a propeller, the cyclorotor system has more of the appearance of a spinning drum or barrel with blades on the rounded portion of the cylinder.

In a preferred embodiment, the cyclorotor propulsion systems are driven by electric motors, which receive power from batteries or other sources including but not limited to fuel cell systems. Regardless, any sort of powerplant may be used so long as mounting configurations consider engineering consideration of the consequences of configurations that induce steady-state gyroscopic precession forces.

In embodiments, the mounting and configuration of the cyclorotor system may range from a cantilevered spinning drum attached only at its base, to a pedestal mounted arrangement with cyclorotor blades supported, driven, and pitched at the middle of their span, to a cyclorotor system fully supported on both ends of its spin axis, including a cyclorotor system enclosed in a duct to contain and control the airflow through the propulsion system and to protect the components therein.

Another embodiment discloses a configuration wherein one cyclorotor propulsion system is attached to each low-disc-loaded main rotor blade. The primary purpose of the cyclorotor propulsion system is to provide motive force to accelerate and maintain main rotor blade rotational speed to provide lift to support and propel the whole vehicle. A secondary function provided by the cyclorotor propulsion system is to provide variable magnitude and direction of thrust. By independently varying the magnitude and direction of the thrust produced as main rotor blades spin around the central vehicle axis, net propulsive forces are created which provide for stabilization and control of the vehicle as a whole. In a preferred embodiment, control of the vehicle and its subsystems is accomplished using a vehicle systems control computer. In a preferred embodiment the vehicle systems control computer has facility for sensor readings which inform software control, through appropriate interfaces, of flight hardware elements such as cyclorotor thrust generator speed, maximum pitch excursion, and phase of maximum pitch excursion, as well as aerodynamic-lift-altering control surfaces.

DETAILED DESCRIPTION OF THE INVENTION

The present disclosure discusses inventive aspects that yield improvements in the fatigue-considered service life of components and precision of control of velocity and position for rotorcraft. The principles discussed herein may apply to both crewed or uncrewed vertical takeoff and landing flight vehicles. As will be discussed in more detail in connection with specific embodiments, a rotorcraft is contemplated having a rotating rotor system and, optionally, a de-spun, non-rotating section if payload and sensor requirements dictate. The term rotor in the present disclosure refers to the structure that is also sometimes referred to in the art as a rotary wing or rotor blade. A prior patent (Cubbage U.S. Pat. No. 12,240,595 B2) is hereby incorporated by reference where questions of individual component function may arise.

The cyclorotor propulsion units may be configured to spin in the same direction as the rotation of the main rotors on the vehicle. In this configuration there may be benefit from relatively higher force generation from higher airspeed seen by the outboard advancing cyclorotor blades as they encounter the oncoming air.

The cyclorotor propulsion units may be configured to spin opposite the direction of the main rotors on the vehicle. In this configuration there may be benefit from lower drag due to relatively lower airspeed seen by the outboard retreating cyclorotor blades. There may also be benefits during maneuvering of the vehicle when general gyroscopic forces will arise. Because the cyclorotor propulsion systems spin in the opposite direction from the main rotor system the forces generated due to gyroscopic precession will oppose each other and tend to partially cancel each other out when viewed from the perspective of the vehicle as a whole. Further, the motor torque that must be generated to spin the cyclorotor blades also tends to cause the main rotor blades to turn about the main rotor spin axis.

Note in the prior art (Choi U.S. Pat. No. 10,384,776 B2), mention is made of mounting cyclorotor systems within a ducted wing structure, but in this case the spin axis of the cyclorotor systems is oriented generally horizontally. Likewise, (Stearns U.S. Pat. No. 4,702,437 A) employs radially arrayed crossflow fans mounted within rotors to spin the rotors. Other prior art mentions the use of cyclorotors with vertical spin axes (Adams U.S. Pat. No. 11,614,754 B2; CN 202481313 U). However, (Adams 754) employs a single vertical-axis cyclorotor located near the center of mass that generates precise lateral maneuvering forces, and the Chinese patent (202481313) mounts cyclorotor propulsion systems in a flying wing to produce generally longitudinal thrust for forward movement. No mention is made of employing cyclorotor systems in reaction drive helicopter systems for any purpose.

In general, the amount of thrust produced by a cyclorotor propulsion system is proportional to the speed at which the cyclorotor blades are turning and the amount of pitch excursion they experience with each revolution. The general direction in which the thrust is produced depends on the position or angle in the rotation about the cyclorotor spin axis at which the cyclorotor blades are subjected to the maximum pitch excursion. However, the thrust direction is also somewhat dependent on the direction and magnitude of the free stream airflow in which the cyclorotor propulsion system operates. Changing the speed of rotation of the cyclorotor propulsion system changes the maximum amount of thrust possible. Changing the amount of pitch excursion of the cyclorotor blades changes the actual relative amount of thrust produced. Changing the position or phase angle at which the maximum pitch excursion occurs changes the direction in which the thrust is produced. Controlling these three factors—rotational speed of the system, amount of maximum pitch excursion, and phase angle of maximum pitch excursion—allows a very high degree of control over the amount and direction of thrust produced.

If net maneuvering force magnitude is sufficient and directional control of the thrust is adequate then the air vehicle can be maneuvered without changing the orientation of the axis of spin of the main rotor system.

Gyroscopic precession torque is only produced when the axis of a spinning mass is changed from its previous orientation. The gyroscopic precession torque generated is proportional to the rotational inertia of the spinning mass, the angular rate of the spinning mass, and the angular rate of change of the direction of the spin axis of the spinning mass. The expression for gyroscopic precession torque is:

$$\vec{\tau} = (I\vec{\omega_r}) \times (\vec{\Omega_p})$$

where $\vec{\tau}$ is the torque vector, I is the rotational moment of inertia of the spinning mass (e.g. the motor and propeller; units such as $Kg \cdot m^2$), $\vec{\omega_r}$ is the angular rate of rotation of the spinning mass (rad/s), and $\vec{\Omega_p}$ is the angular rate of precession of the axis of the spinning mass (rad/s). The torque generated is the vector cross product of the angular momentum of the spinning mass, ($I\vec{\omega_r}$), and the precession rate of the spin axis ($\vec{\Omega_p}$).

In some instances, the vertical position or altitude of the reaction drive helicopter must be changed. In these instances, the aerodynamic-lift-altering control surfaces are controlled collectively to produce more or less lift as they rotate about an unchanging spin axis. The main rotor spin axis, while it may move vertically, does not change orientation therefore no gyroscopic precession torque is produced.

In some instances, changing the direction of the main rotor spin axis is unavoidable. One example of this is when the reaction drive helicopter must transition from pure hover to rapid translational flight. In no-wind conditions, the spin axis of the main rotors must be changed from purely vertical, as needed for hover, to an orientation that allows some component of the lift generated to contribute to accelerating and propelling the reaction drive helicopter vehicle forward. In these instances, aerodynamic-lift-altering control surfaces on each main rotor are cyclically controlled in their rotation about the main rotor spin axis so that the path of the main rotors is changed and the spin axis changes orientation as a result. Because the spin axis of the main rotors must be changed in this case, both the control system of the vehicle and its structural design must take the effects of gyroscopic precession torque into consideration.

Once the amount and direction of thrust can be controlled, then the reaction drive helicopter which employs cyclorotor propulsion systems behaves much like the system described in (Cubbage 595). The reader is encouraged to reference that document when detailed questions about the operation of the systems arise. The added degree of control of the direction of the thrust facilitated by the present invention provides even finer control over the position and velocity of the vehicle than that described in (Cubbage 595).

Figure 1:
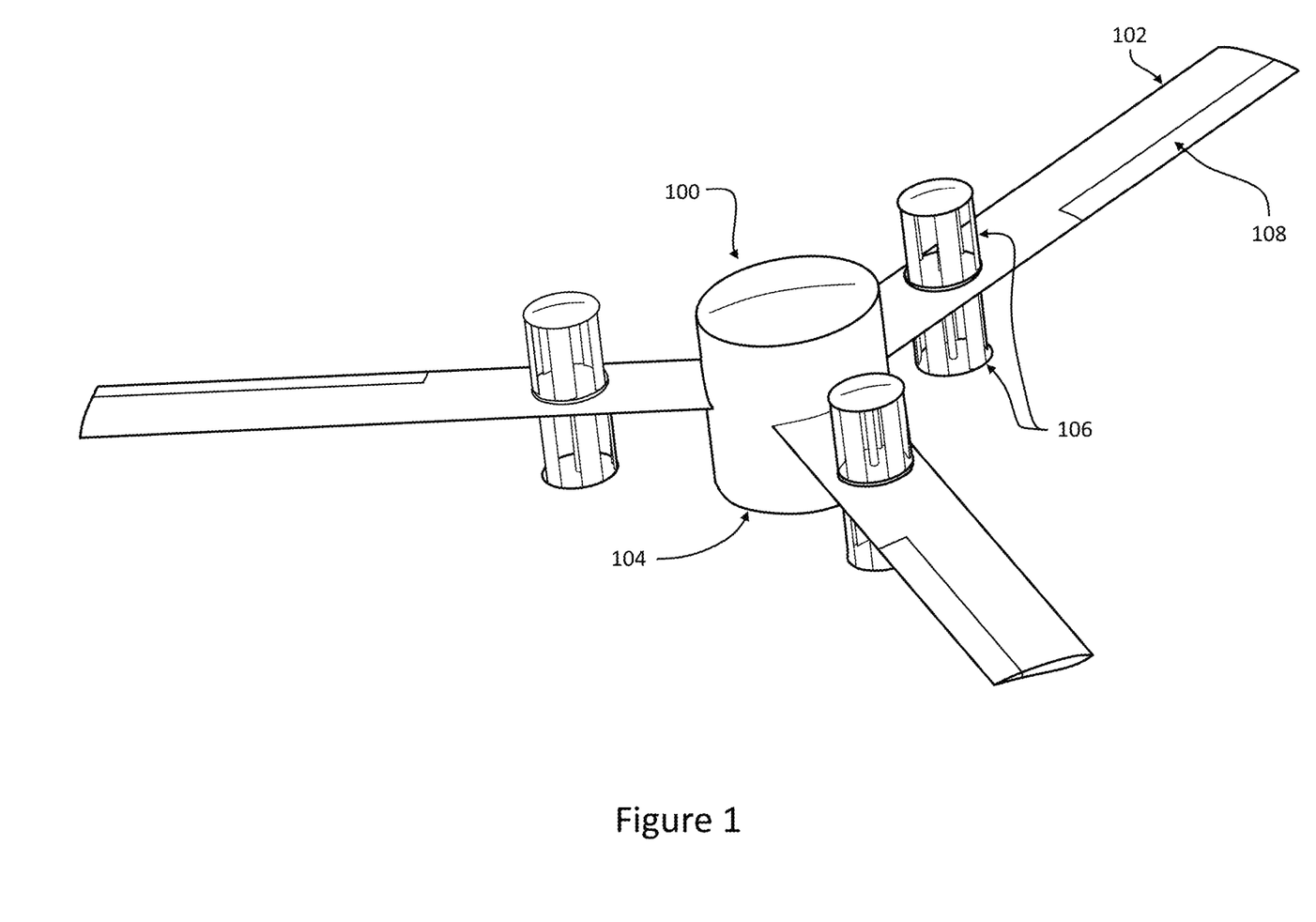
FIG. 1 is a perspective view of a utility air vehicle in accordance with an embodiment which features cyclorotor thrust generators of the cantilevered sort; Note that in this instance the distal ends of the cyclorotor thrust generators are depicted with optional endplates.

With reference to FIG. 1, an uncrewed utility air vehicle 100 is depicted in perspective view in a minimalistic configuration. Depicted is a system with three main rotor blades 102 attached to a central hub 104. Attached to each main rotor blade 102 are two cyclorotor-type thrust generators 106, one mounted above and one mounted below each main rotor blade 102. As depicted, the central hub 104 rotates with the rest of the vehicle. In this case, orientation is derived by the fusion of data from magnetometer, angular rate gyro, and accelerometer sensors to develop filtered, real-time orientation with respect to a non-moving earth-referenced frame. Control of the uncrewed utility air vehicle 100 may be accomplished by cyclically varying the amount and direction of thrust produced by each cyclorotor thrust generator 106, as well as the collective and cyclic control of the one or more individually articulable aerodynamic-lift-altering control surfaces 108 attached each main rotor blade 102.

It is contemplated that a rotorcraft air vehicle 100 in accordance with this disclosure can be configured in a broad range of sizes and diameters. In a preferred embodiment the air vehicle 100 has a rotor disk span in the range of approximately 8-15 meters, and more preferably about 10-12 meters. Preferably, the rotors may spin at a speed on the order of 80-150 revolutions per minute (RPM), more preferably about 90-120 RPM. In a preferred embodiment, main rotor speed is maintained by cyclorotor thrust generators mounted both above and below each main rotor at a position nearer the hub of the rotor system than the tips of the main rotors.

Construction of the air vehicle 100 may employ materials and methods as are in keeping with best practices currently in use in the industry. It will be recognized by one with skill in the art that the choice of elements and the overall size and configuration of any particular embodiment of the invention may reflect engineering trade-offs made to optimize performance under particular flight mission requirements. Further, as more advanced and advantageous materials, components, and manufacturing techniques become available they may be employed as best suited to embodiments of the present invention. A wide variety of architectures and configurations may be possible without departing from the spirit and scope of the present invention.

Figure 2:
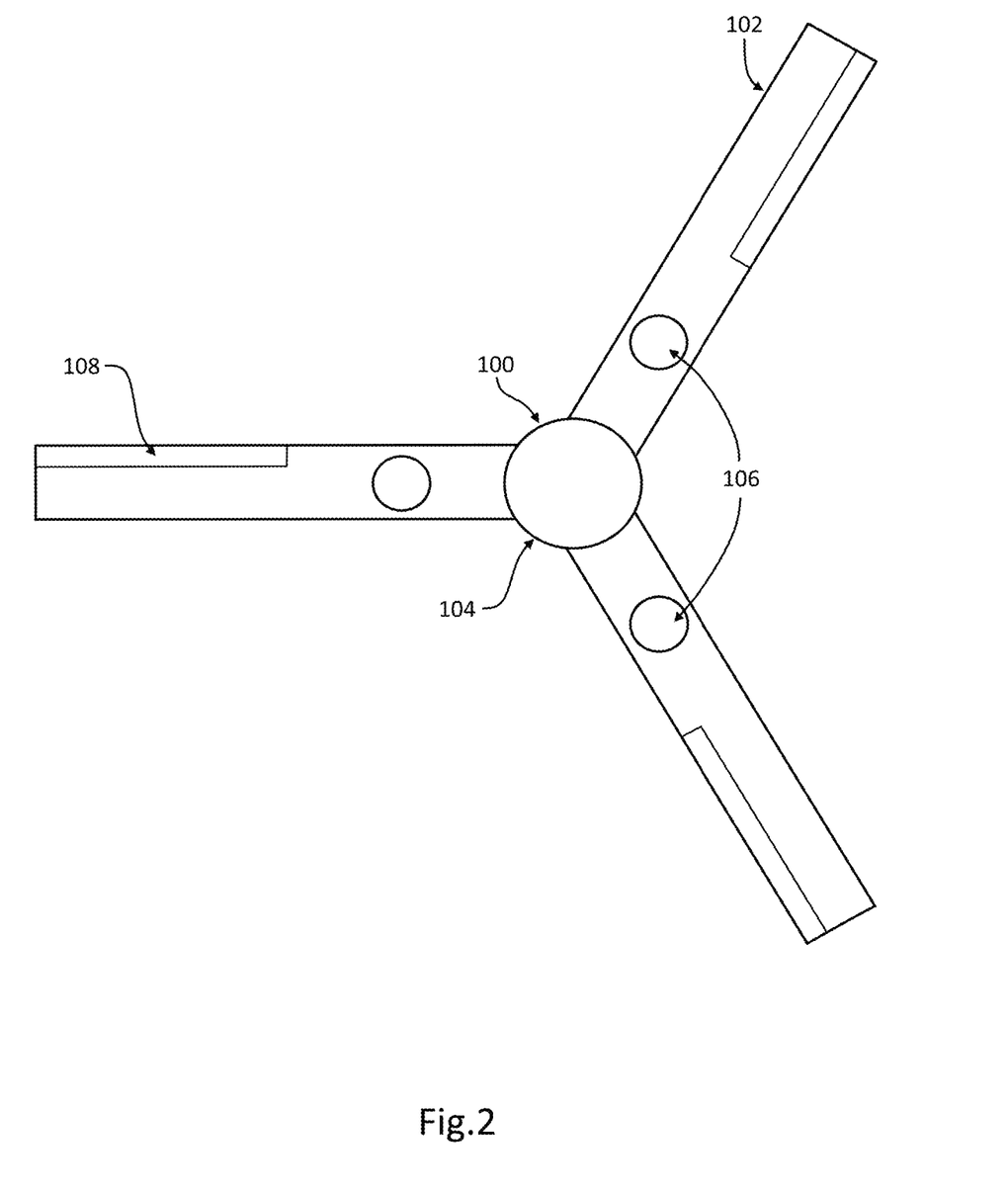
FIG. 2 is a top view of the vehicle of FIG. 1.

FIG. 2 depicts a top view of the vehicle shown in FIG. 1.

One skilled in the art will recognize that the radial position of the thrust generators 106 will be dependent on several factors. One factor is related to the relationship between thrust generated and the power required to generate it. Thrust produced is proportional to the mass of the airflow affected and the increase in velocity imparted on the entrained airmass. Power required is proportional to the airflow mass and the square of the velocity. The most power-efficient thrust generators ingest large amounts of air and modestly accelerate the air from a low speed to a higher speed.

On a spinning helicopter rotor the slowest average airspeed is seen at or near the root of the main rotor blades. But there is a factor that directly competes with thrust generator location near the root of the blade. On a reaction drive helicopter the main rotor rotation speed must be maintained by the production of a torque within the rotor system. Torque is the product of a force, and the moment arm on which it acts. Locating the thrust generator at a greater radial distance from the main rotor spin axis, if it generates the same thrust as a root-mounted thrust generator, causes more torque to be produced. But producing the same amount of thrust at the higher speed experienced at radially greater distances costs more power. Specific design trade-offs will need to be made after considering power requirements and availability, thrust generator efficiency as a function of inlet airspeed, and many other requirements and characteristics specific to the vehicle and the mission.

Figure 3:
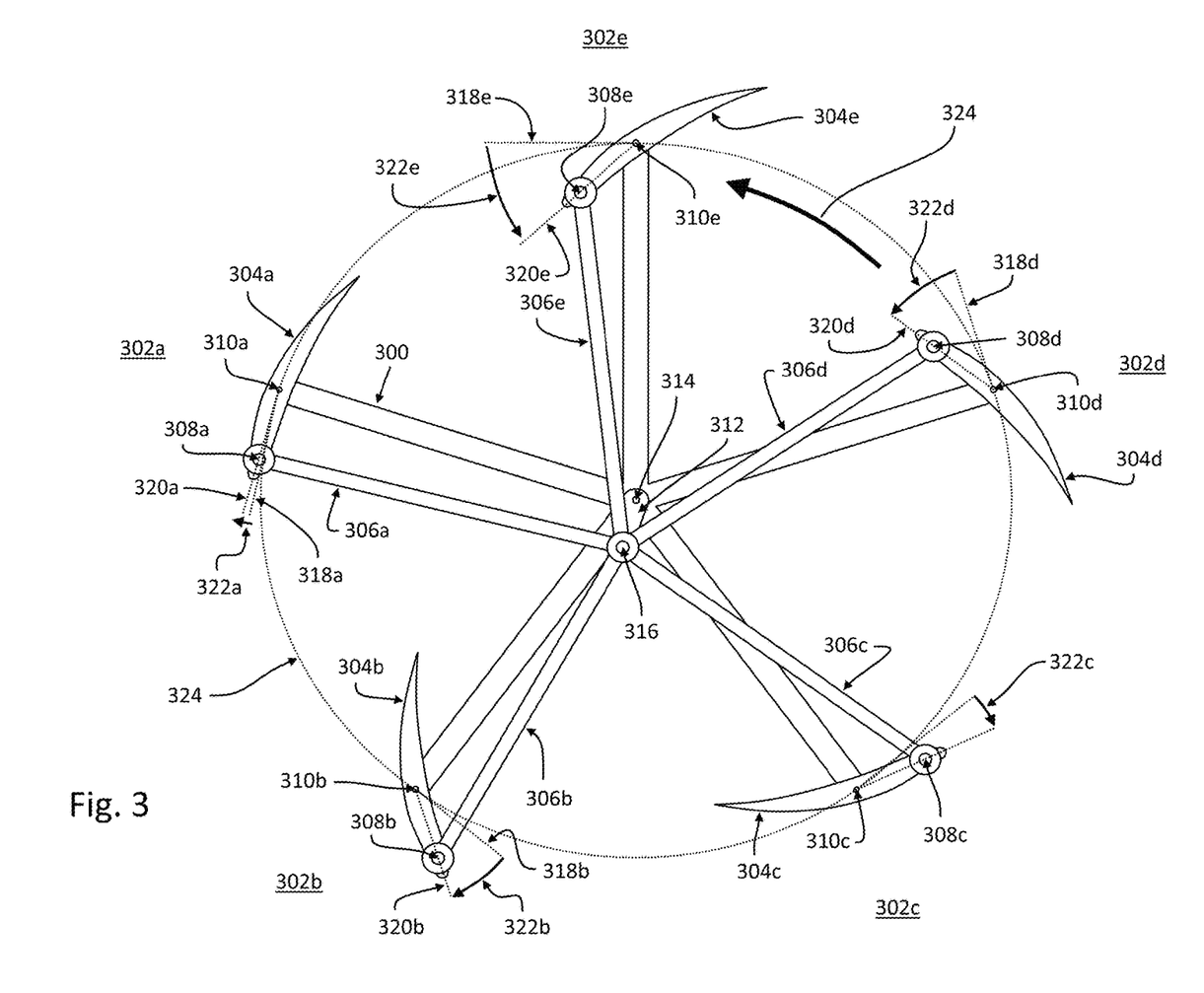
FIG. 3 is an axial view of an open cyclorotor thrust generator looking along the axis of rotation of the cyclorotor system at one instant in time. The eccentric pitch offset axis of the cyclorotor is illustrated as well as the operation of connecting rods which cause the pitching movement of the cyclorotor blades.

FIG. 3 depicts an end view of an individual cyclorotor thrust generator without the end plates depicted in those in FIG. 1. As depicted, the normal operating direction 324 of this cyclorotor thrust generator is counter-clockwise.

A single-piece, spoked support wheel 300 is provided and usually configured with bearings at blade pivots 310a, 310b, 310c, 310d, and 310e to reduce friction losses and support aerodynamic and centrifugal force loads due to the cyclorotor blades 304a, 304b, 304c, 304d, and 304e. The spin axis 314 of the depicted cyclorotor thrust generator is usually configured with one or more bearings to reduce friction losses and support loads imposed by the operation of the cyclorotor thrust generator. Blade pivots 310a, 310b, 310c, 310d, and 310e are constrained by spoked support wheel 300 to move in a circular path around the cyclorotor thrust generator spin axis 314.

A pitch offset member 312 provides for locating a pitch offset axis 316. Pitch offset connecting rods 306a, 306b, 306c, 306d, and 306e are rotatably connected between pitch offset axis 316, and their respective cyclorotor blade pitch connections 308a, 308b, 308c, 308d, and 308e. Blade pitch connections 308a, 308b, 308c, 308d, and 308e are constrained to move in a circular path due to the pitch offset axis 316 and the length of pitch offset connecting rods 306a, 306b, 306c, 306d, and 306e. Note that the circular path of the pitch offset connecting rods does not coincide with the circular path of the cyclorotor blade pivots 310a, 310b, 310c, 310d, and 310e. This difference causes the pitching action of the individual cyclorotor blades 304a, 304b, 304c, 304d, and 304e that ultimately produces the net thrust force as the cyclorotor thrust generator rotates.

Note that the pitch offset connecting rods 306a, 306b, 306c, 306d, and 306e must exist as separate pieces because unlike the spoked support wheel 300 which constrains the individual cyclorotor blades to identical angles with respect to each other, the angles between the pitch offset connecting rods are neither constant nor identical. This behavior is due to the changing geometry as the cyclorotor blades rotate about the spin axis 314 of the cyclorotor thrust generator, and is dependent on the relative position of the blade pitch connections 308a, 308b, 308c, 308d, and 308e with respect to the pitch offset axis 316.

With specific reference to location 302a, the relative geometry of blade pivot 310a, pitch offset axis 316, and the pitch offset connecting rod 306a, work in concert to produce a very small cyclorotor blade 304a angle of attack. Note the tangent line 318a and the cyclorotor blade chord line 320a are very nearly coincident. The attack angle between them, 322a, is positive but nearly zero. At location 302b the blade pivot 310b is much closer to the pitch offset axis 316 and therefore the attack angle 322b measured between tangent line 318b and the cyclorotor blade chord line 320b is positive but larger than at 302a.

At location 302c the distance between blade pivot 310c, and pitch offset axis 316 is increased from location 302b and therefore the attack angle 322c is still positive but the magnitude is smaller than at 302b. Turning attention to location 302d it can be seen that the distance between pitch offset axis 316 and blade pivot 310d is greater than the distance from spin axis 314 to blade pivot 310d. This causes the attack angle 322d measured between tangent line 318d and the cyclorotor blade chord line 320d to be negative.

Finally, at location 302e the distance between pitch offset axis 316 and blade pivot 310e is very nearly at its maximum value. This causes the attack angle 322e measured between tangent line 318e and the cyclorotor blade chord line 320e to be near its maximum negative value.

Figure 4:
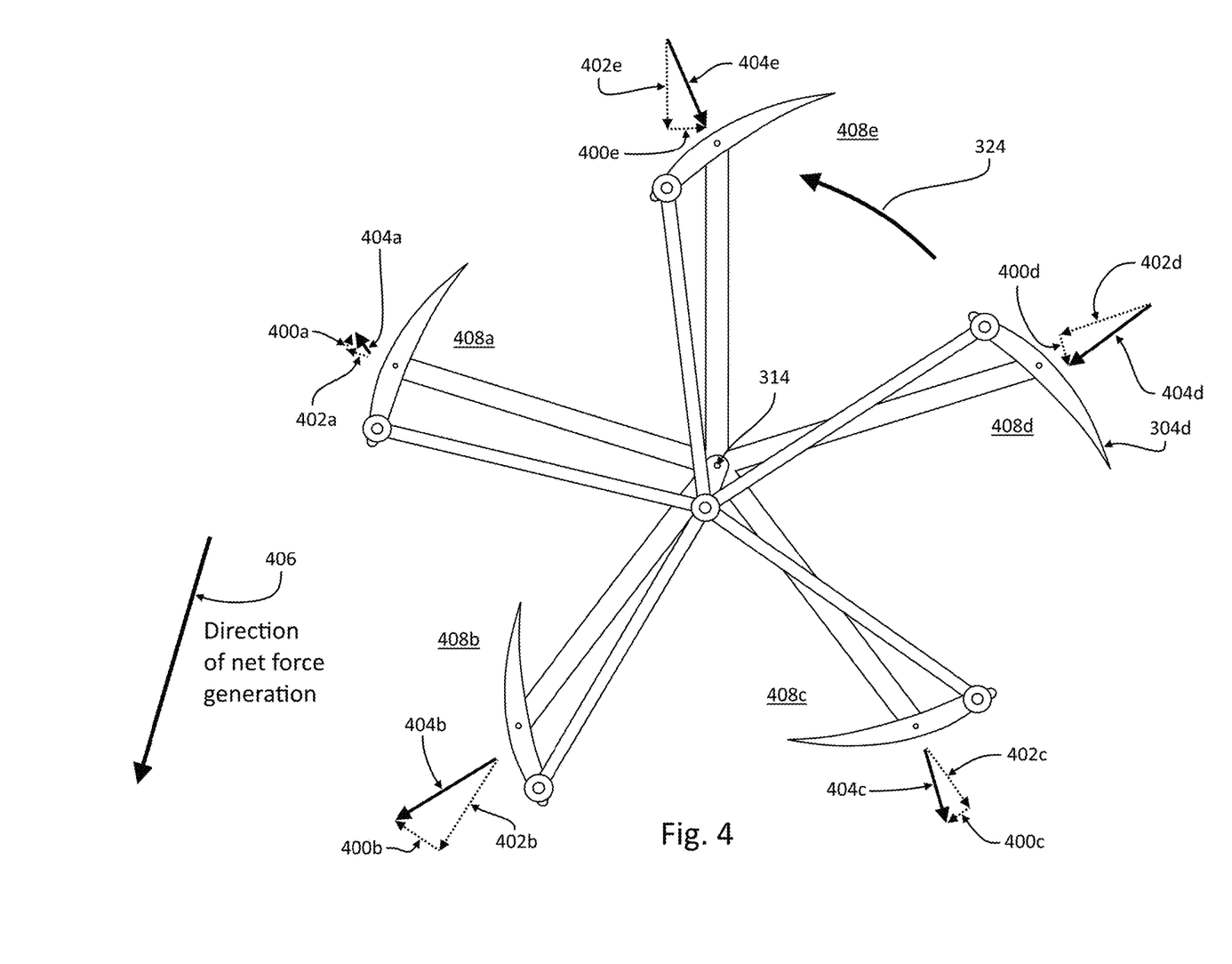
FIG. 4 depicts the cyclorotor thrust generator of FIG. 3 and the resultant aerodynamic force vector created at each cyclorotor blade as well as the direction of the net resultant force when the contributions of all cyclorotor blades are considered.

FIG. 4 illustrates the same cyclorotor thrust generator in the same position as in FIG. 3. As in FIG. 3, the illustrated cyclorotor thrust generator spins in a counter-clockwise direction about the cyclorotor spin axis 314. Depicted are the drag components 400a, 400b, 400c, 400d, and 400e of aerodynamic forces generated, the aerodynamic lift components 402a, 402b, 402c, 402d, and 402e generated, and the combined resultant forces 404a, 404b, 404c, 404d, and 404e.

Recalling the small positive angle of attack in FIG. 3 at position 302a, note that the small positive angle attack at position 408a produces a small amount of drag 400a, a small amount of lift 402a, and a small resultant force 404a. While at this position, a cyclorotor blade cannot produce any component of force that contributes to the desired net force 406 but it does produce the least negative impact.

At position 408b the large positive angle of attack produces a large lift force 402b, the attendant large drag force 400b, and the resultant force 404b. At position 408c the angle of attack is positive but less than at 408b. Since the cyclorotor blade at this position is not operating as close to stall, the drag force 400c is less than that at location 408b, though the lift force 402c is significant. Note the relative alignment at 408c of the resultant force 404c with the aggregate net force 406.

With reference to position 408d on FIG. 4, the cyclorotor blade is now pitched into a negative angle of attack. The drag force 400d, as expected, still acts tangentially and opposite the movement of the cyclorotor blade 304d. Due to the negative angle of attack, the lift force 402d acts radially inward. Thus, the resultant force 404d is approximately of the direction and magnitude shown. Lastly, at position 408e the resultant force 404e is seen as the vector sum of the drag force 400e and the lift force 402e, which acts radially inward.

Note that while these vectors sum to a net force generated as show by 406, there is also a net torque created by the individual drag forces 400a, 400b, 400c, 400d, and 400e that tends to slow the rotation of the cyclorotor blades. An opposing torque must be supplied by some sort of powerplant to sustain the rotation of the cyclorotor thrust generator.

Figure 5:
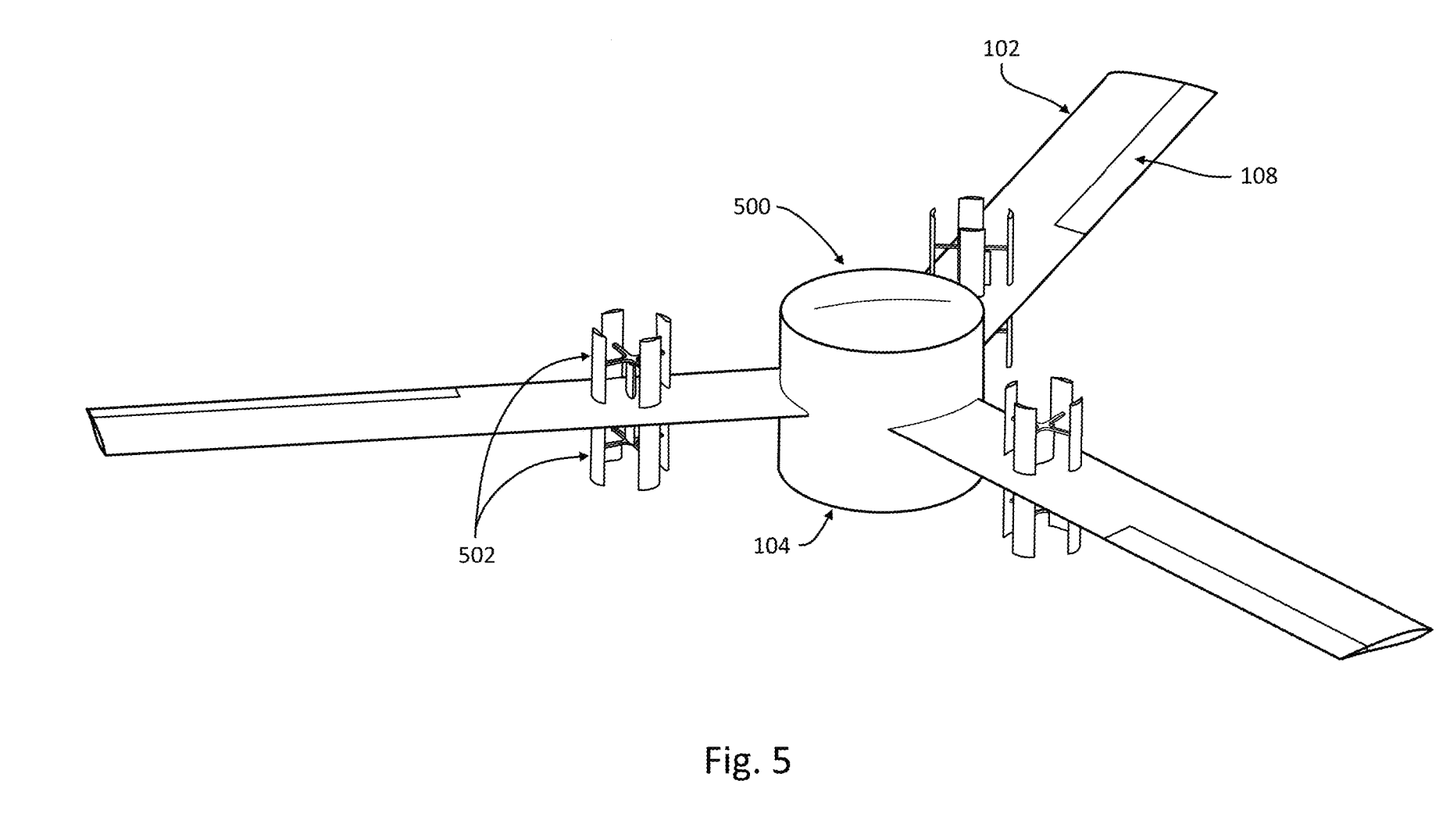
FIG. 5 is perspective view of a utility air vehicle which employs a variation of the cyclorotor propulsion system that is a pedestal-mounted center-drive type as opposed to the end driven system depicted in FIG. 1. In this instance, the distal ends of the cyclorotor are not capped with end plates.

FIG. 5 illustrates a variant of the uncrewed utility air vehicle 500 that is substantially the same as the one depicted in FIG. 1. The uncrewed utility air vehicle 500 still comprises main rotors 102 with aerodynamic-lift-altering control surfaces 108 and a central hub 104. The variant shown in FIG. 5 however employs a slightly different form of cyclorotor. Illustrated in FIG. 5 is a pedestal-mounted cyclorotor system 502 that is driven and supported in a mid-span position of the cyclorotor blades, and that does not include the end caps as previously depicted. Many types and configurations of cyclorotor thrust generators exist and this illustrates just two variations that can be employed as needed. For instance, research and empirical results suggest that cyclorotor thrust generators which omit the end caps tend to have slightly less power efficiency but can generate more thrust for a given system size and weight. Choice of which type of cyclorotor thrust generator to use is therefore an engineering exercise dependent on system design constraints.

Figure 6:
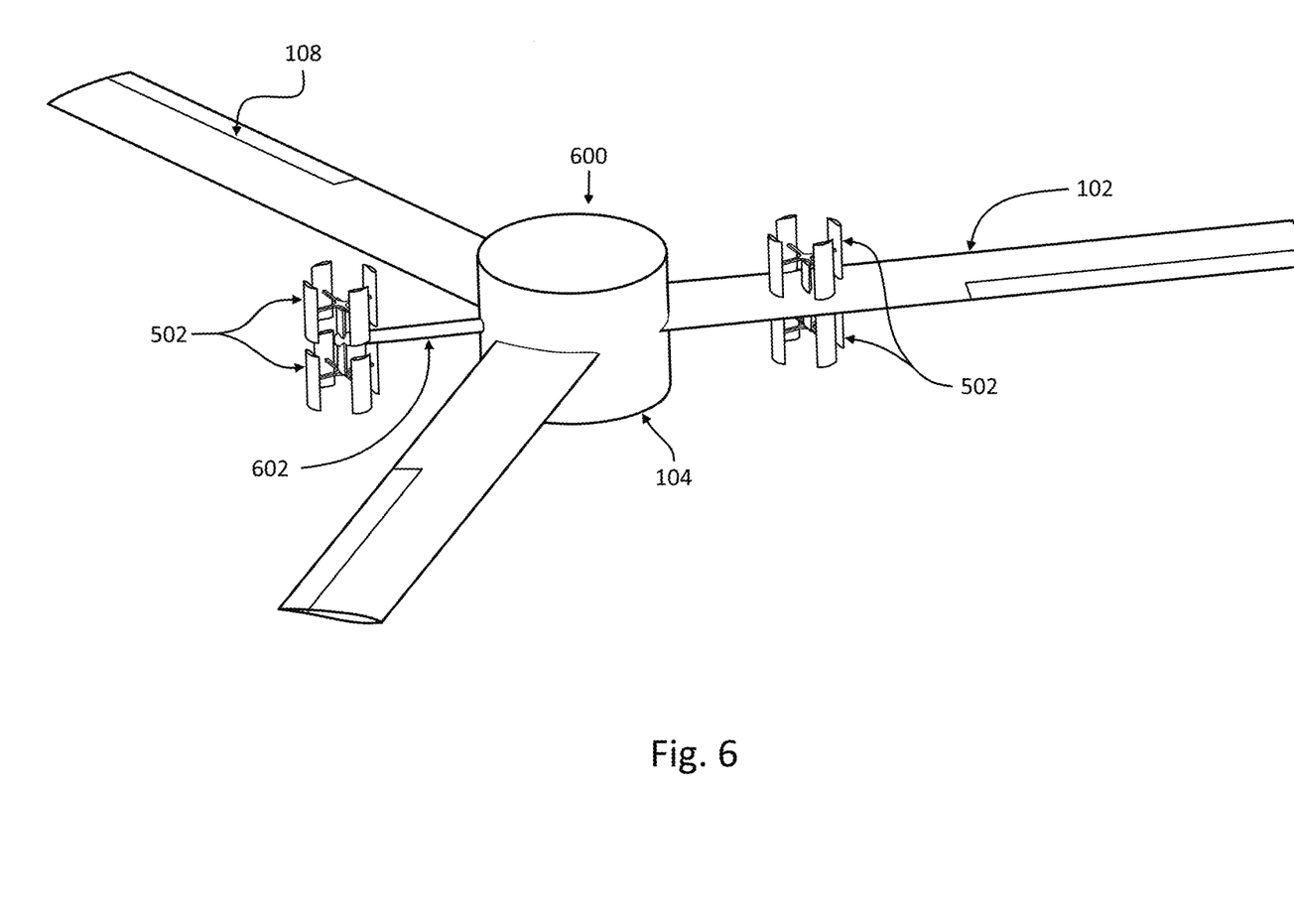
FIG. 6 is a perspective view of a utility air vehicle which includes both rotor-mounted thrust generators and strut-mounted thrust generators.

FIG. 6 depicts yet another possible configuration 600 which depicts the tri-lateral symmetry of the main rotor blades 102 but employs bi-lateral symmetry for mounting the thrust generators 502, two of which are mounted on pylon 602 in order to provide a balancing mass and thrust location that can provide torque to help sustain main rotor system rotation.

Figure 7:
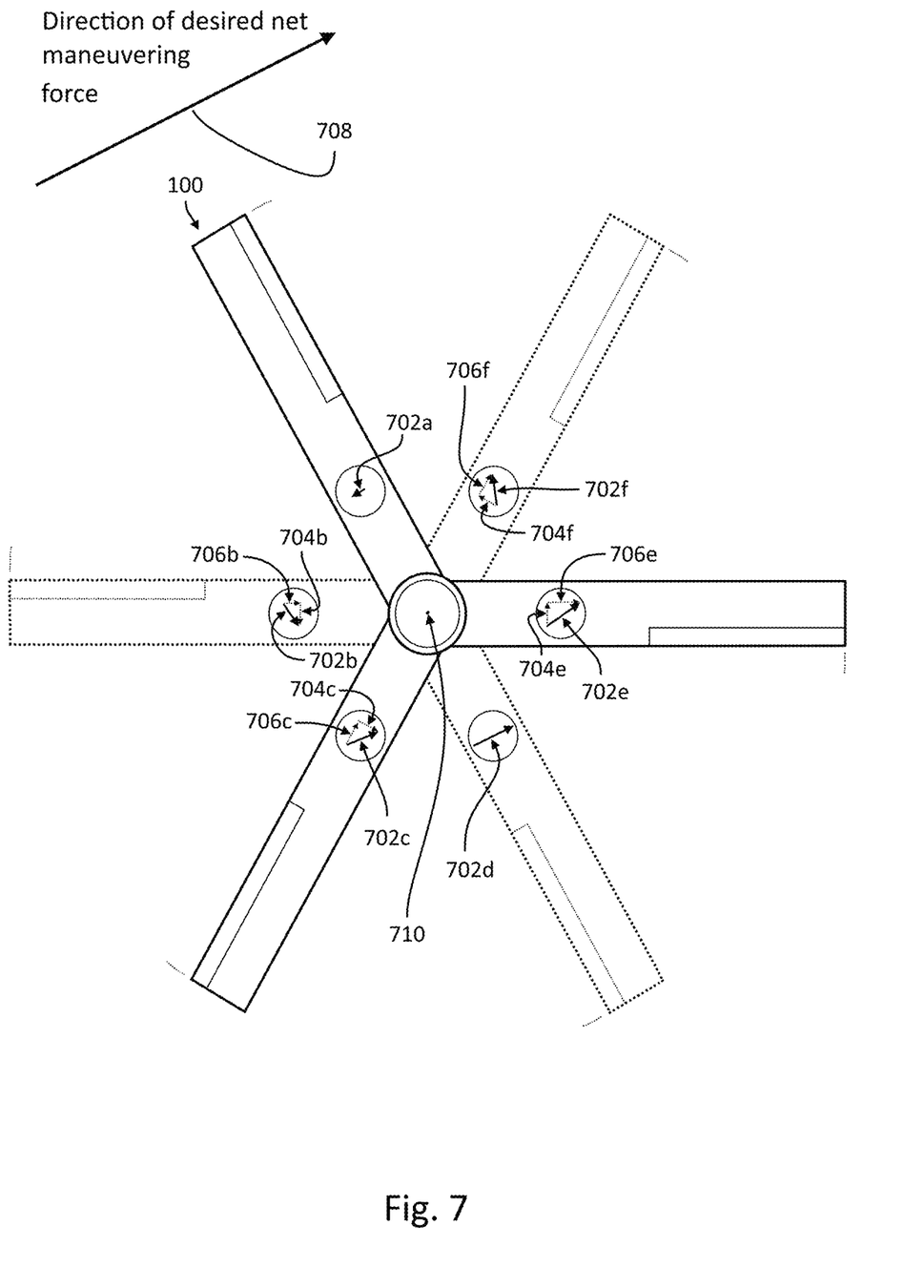
FIG. 7 depicts a main rotor blade in each of six positions, the variable thrust produced in each case, and the resultant net maneuvering force.

With specific reference to FIG. 7, which depicts a main rotor blade in each of six different positions, the method of control of thrust for maneuvering is illustrated. The cyclorotor propulsion system on each main rotor must always generate some tangential component of thrust to maintain main rotor rotational speed necessary for flight. However, by varying the magnitude and direction of the thrust produced as the rotor rotates around the main rotor spin axis, net radial force can be produced as well. This net radial force may be used to maneuver the reaction drive helicopter without the need to change the orientation of the spin axis of the main rotors. As previously mentioned, changing the direction of the spin axis of a spinning mass will subject the mass to gyroscopic precession torque. But variable thrust magnitude and direction as a main rotor rotates through various sectors about its spin axis allows some degree of maneuvering without precession of the main rotor spin axis. This means that gyroscopic precession torque is not produced and component parts of the reaction drive are not exposed to this additional fatigue-failure-inducing phenomenon.

FIG. 7 illustrates six different possible positions of a main rotor blade, its attached cyclorotor thrust generator, and the relative thrust magnitude and direction that might be employed to sustain main rotor rotation and also to provide a net lateral force for maneuvering or station-keeping in the presence of winds. It is to be understood that the six discrete positions shown are merely examples to illustrate how modulating thrust magnitude and direction can be used to facilitate operation of the air vehicle.

To sustain rotation of the main rotors each cyclorotor thrust generator must produce a tangential component of thrust. These tangential components of thrust are labeled as 702a, 704b, 704c, 702d, 704e, and 704f. When a net lateral maneuvering force is required then each cyclorotor thrust generator must often alter both the magnitude and the direction of the thrust produced. This means that radial components of thrust 706b, 706c, 706e, and 706f must be altered at some positions to provide applicable contributions to the net maneuvering force. Note that forces 702a and 702d contain no radial component of thrust because any radial component would be perpendicular to the direction of the desired net maneuvering force and therefore not useful. Finally, consider the vector sum of all the moments about spin axis 710 and the thrust forces generated 702a, 702b, 702c, 702d, 702e, and 702f. The result is a torque that sustains main rotor rotation and a force 708 that allows for maneuvering of the vehicle.

Figure 8:
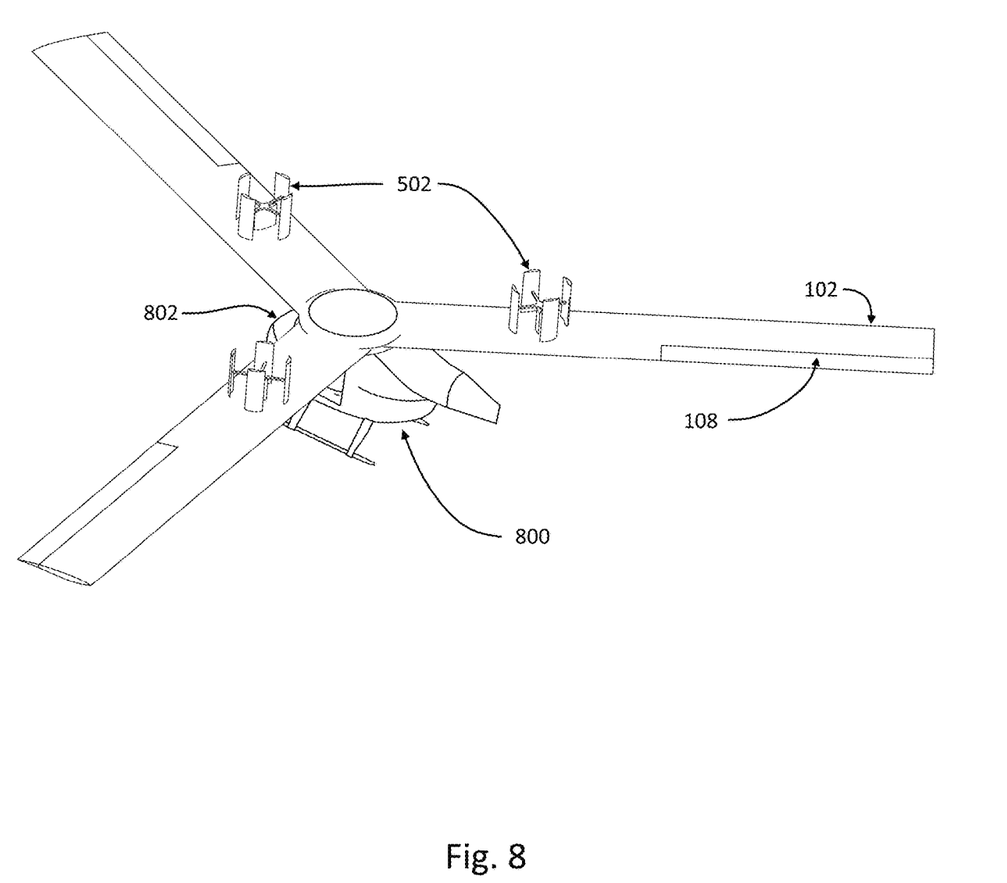
FIG. 8 depicts a three-rotor crewed air vehicle which includes a substantially non-rotating fuselage disposed below the main rotor system.

FIG. 8 illustrates a crewed vehicle 800 which provides for a generally non-rotating fuselage 802 disposed below a reaction drive helicopter rotor system. Common elements of the main rotors 102 and lift-altering control surfaces 108 are depicted as are single cyclorotor thrust generators 502 disposed on the upper surfaces. The choice of not having cyclorotor thrust generators located below the main rotors may be made to ensure passenger and crew safety when the rotors are turning.

Figure 9:
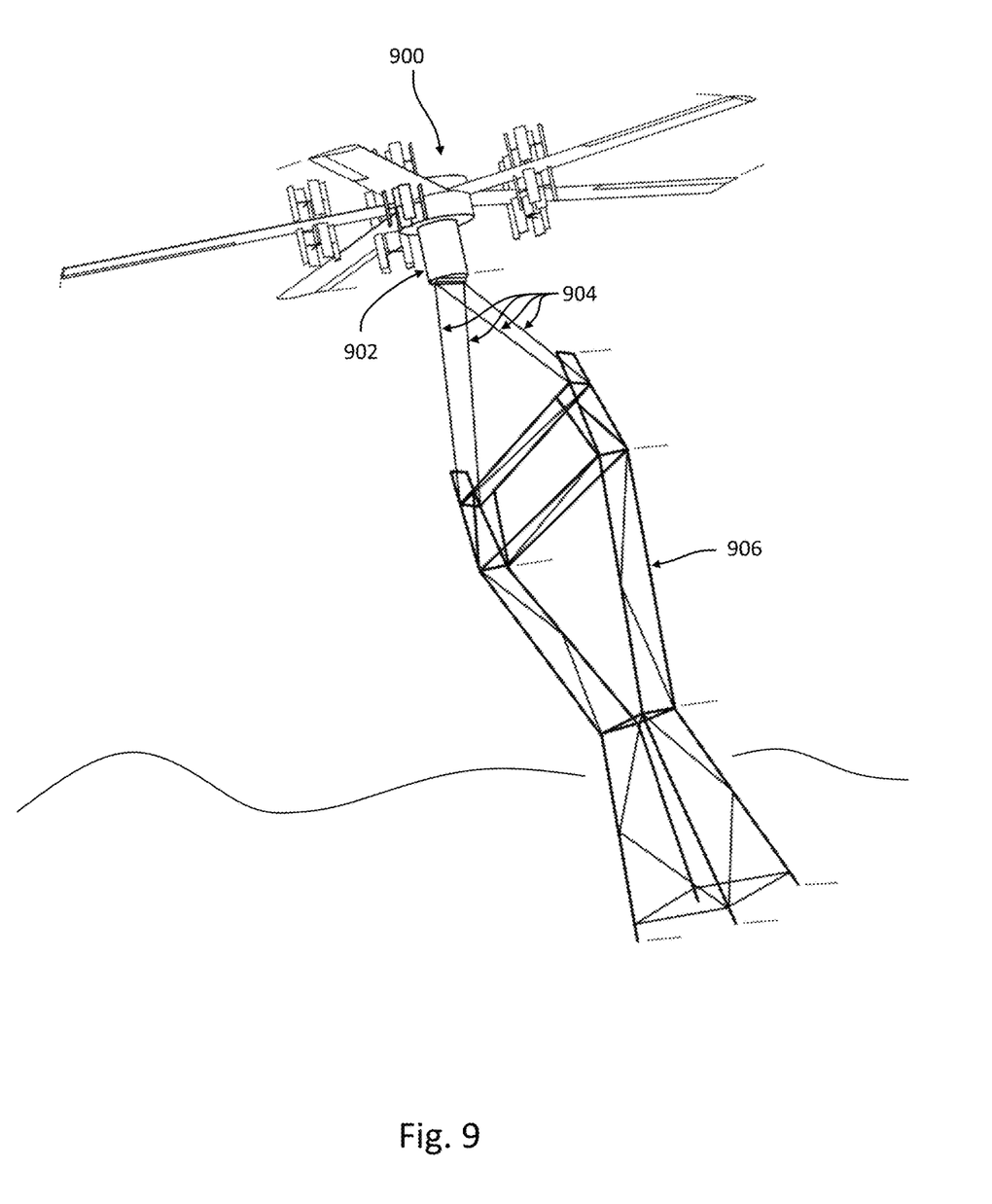
FIG. 9 depicts a substantially larger five-rotor remotely-piloted vehicle designed for aerial crane operation during transport of part of a high voltage transmission line tower.

FIG. 9 depicts a large uncrewed aerial crane vehicle 900 configured with 5 main rotors and 2 cyclorotor thrust generators per main rotor. The lower fuselage 902 is configured to be generally non-rotating with respect to the main rotor system and elongated to facilitate operation with loads slung beneath it. Attached beneath the load sling 904 is part of a high voltage transmission tower 906 which is shown as an example payload.

It is to be understood that the principles discussed herein can be applied to many flight missions and profiles currently performed by other uncrewed and crewed flight vehicles. Carriage of a wide variety of mission payloads (e.g. communications repeaters; intelligence, surveillance, and reconnaissance equipment; critical items to be delivered for humanitarian purposes) and flight profiles (e.g. extreme high-altitude flight to avoid weather, nap-of-the-earth flight to avoid winds or detection by hostile actors) may entail structural adjustments while still applying inventive principles.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above but should be determined only by a fair reading of the claims that follow.

What is claimed is:

1. A rotary wing aircraft comprising:
   a main rotor system comprising a central hub and a plurality of rotors attached thereto;
   the main rotor system configured to rotate about a main rotor spin axis that is substantially vertical;
   the plurality of rotors arrayed radially and symmetrically about the main rotor spin axis wherein each of the attached rotors comprises:
   a rotor blade comprising an airfoil shape in the plane perpendicular to its longest axis;
   one or more aerodynamic-lift-altering control surfaces;
   one or more cycloidal rotor thrust generator (cyclorotor) systems attached to one or more of the rotors, each cyclorotor configured to spin about an axis that is not coincident with, but substantially parallel to the main rotor spin axis;
   each cyclorotor configured to control the amount thrust produced, and the direction in which the thrust is produced;
   at least one motor system configured to rotate one or more individual cyclorotors about their spin axes;
   at least one power system capable of delivering motive power to the one or more motor systems;
   a vehicle systems control computer configured to control the component parts of the rotary wing aircraft in a prescribed manner including the rotational speed, maximum pitch, and phase angle of maximum pitch of the cyclorotors, and the positions of the one or more aerodynamic-lift-altering control surfaces.

2. A rotary wing aircraft comprising:

a main rotor system comprising a central hub, a plurality of rotors, and one or more mounting pylons attached thereto;

the main rotor system configured to rotate about a main rotor spin axis that is substantially vertical;

the plurality of rotors arrayed radially and symmetrically about the main rotor spin axis wherein each of the attached rotors comprises:

a rotor blade comprising an airfoil shape in the plane perpendicular to its longest axis;

one or more aerodynamic-lift-altering control surfaces;

one or more cycloidal rotor thrust generator (cyclorotor) systems attached to the one or more mounting pylons connected to the central hub, each cyclorotor configured to spin about an axis that is not coincident with, but substantially parallel to the main rotor spin axis;

at least one motor system configured to rotate one or more individual cyclorotors about their spin axes;

at least one power system capable of delivering motive power to the one or more motor systems;

a vehicle systems control computer configured to control the component parts of the rotary wing aircraft in a prescribed manner including the rotational speed, maximum pitch, and phase angle of maximum pitch of the cyclorotors, and the positions of the one or more aerodynamic-lift-altering control surfaces.

3. A rotary wing aircraft comprising:

a main rotor system comprising a central hub, a plurality of rotors, and one or more mounting pylons attached thereto;

the main rotor system configured to rotate about a main rotor spin axis that is substantially vertical;

the plurality of rotors arrayed radially and symmetrically about the main rotor spin axis wherein each of the attached rotors comprises:

a rotor blade comprising an airfoil shape in the plane perpendicular to its longest axis;

one or more aerodynamic-lift-altering control surfaces;

one or more cycloidal rotor thrust generator (cyclorotor) systems attached to one or more of the main rotors and each of the one or more cyclorotors configured to spin about an axis that is not coincident with, but substantially parallel to the main rotor spin axis;

one or more cyclorotor systems attached to the one or more mounting pylons connected to the central hub, and each of the one or more cyclorotors configured to spin about an axis that is not coincident with, but substantially parallel to the main rotor spin axis;

at least one motor system configured to rotate one or more individual cyclorotors about their spin axes;

at least one power system capable of delivering motive power to the one or more motor systems;

a vehicle systems control computer configured to control the component parts of the rotary wing aircraft in a prescribed manner including the rotational speed, maximum pitch, and phase angle of maximum pitch of the cyclorotors, and the positions of the one or more aerodynamic-lift-altering control surfaces.

4. The aircraft of claim 1 further comprising:

A generally non-rotating fuselage disposed below the main rotor system and rotatably attached to the main rotor system and configured to support the main rotor system while the aircraft is on the ground and to be supported by the main rotor system while the aircraft is in flight.

5. The aircraft of claim 2 further comprising:

A generally non-rotating fuselage disposed below the main rotor system and rotatably attached to the main rotor system and configured to support the main rotor system while the aircraft is on the ground and to be supported by the main rotor system while the aircraft is in flight.

6. The aircraft of claim 3 further comprising:

A generally non-rotating fuselage disposed below the main rotor system and rotatably attached to the main rotor system and configured to support the main rotor system while the aircraft is on the ground and to be supported by the main rotor system while the aircraft is in flight.

\* \* \* \* \*